G. F. SOUTH.
LOAD REGULATED BRAKE.
APPLICATION FILED MAY 4, 1910.

977,756.

Patented Dec. 6, 1910.
2 SHEETS—SHEET 1.

Witnesses
J. S. Edmunds
S. Hardy.

Inventor
George F. South
Per P. J. Edmunds
Attorney

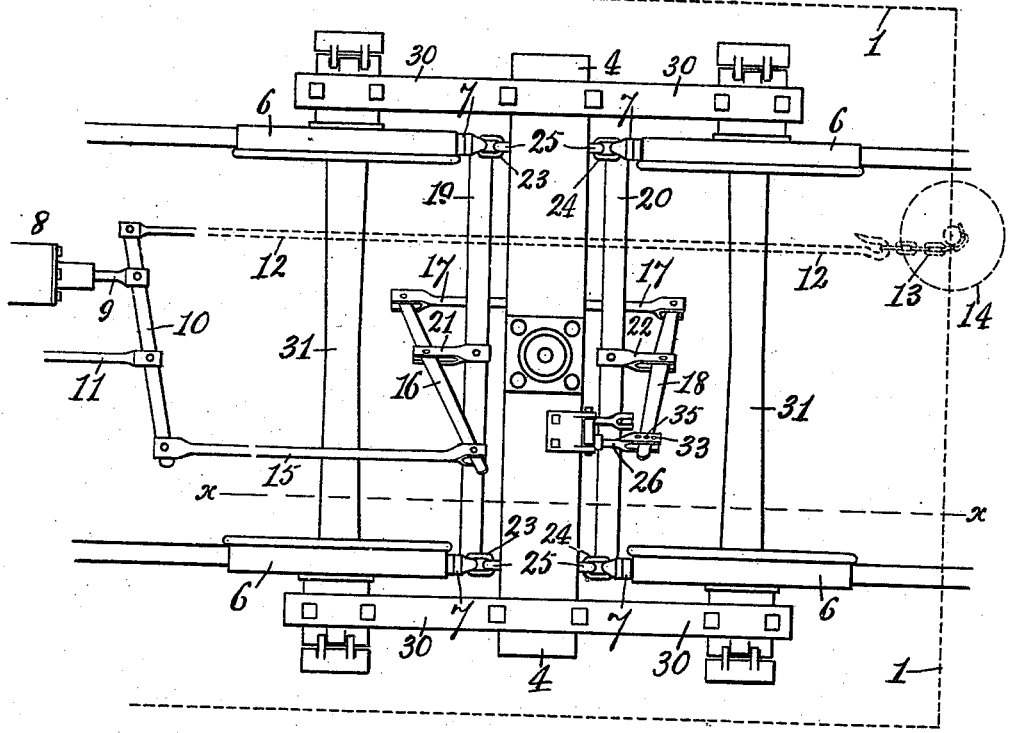
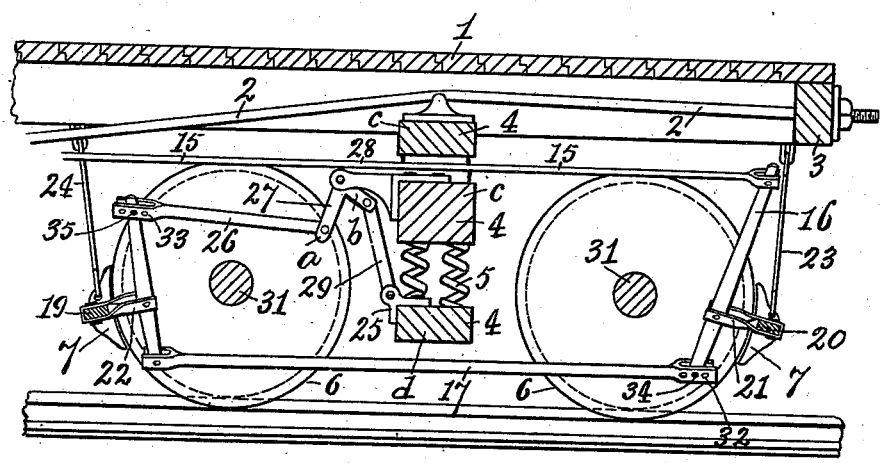

UNITED STATES PATENT OFFICE.

GEORGE F. SOUTH, OF LONDON, ONTARIO, CANADA.

LOAD-REGULATED BRAKE.

977,756. Specification of Letters Patent. Patented Dec. 6, 1910.

Application filed May 4, 1910. Serial No. 559,406.

*To all whom it may concern.*

Be it known that I, GEORGE F. SOUTH, a subject of the King of Great Britain, and a resident of the city of London, in the county of Middlesex, in the Province of Ontario, Canada, have invented a new and useful Load-Regulated Brake, of which the following is a specification.

This invention relates to the combining, uniting or compounding of a system of bars of metal or other substance, such as levers, turning on a fulcrum, to increase the pressure of the brakes on the wheels, or the braking power, of loaded cars or other vehicles, the wheels of which run on a road or way on which iron rails are laid. And it consists of the improved construction and novel combination of parts of the same as will be hereinafter first fully set forth and described and then pointed out in the claims.

Figure 1:
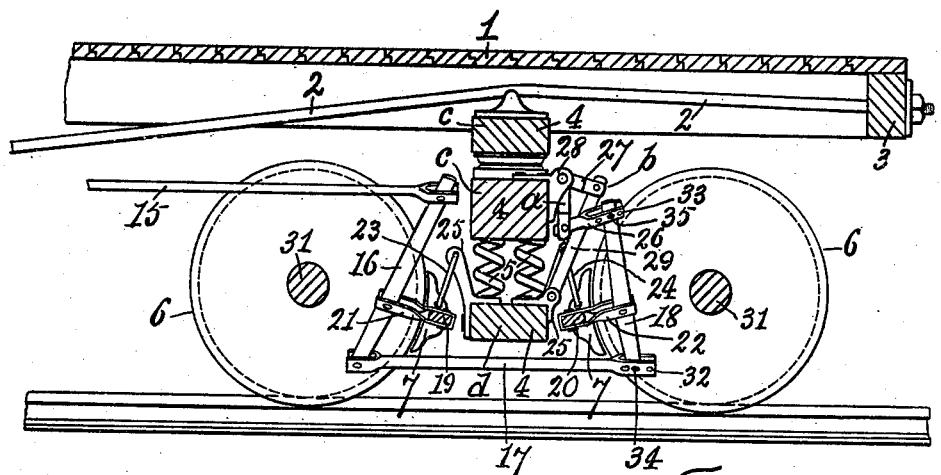
Figure 2:
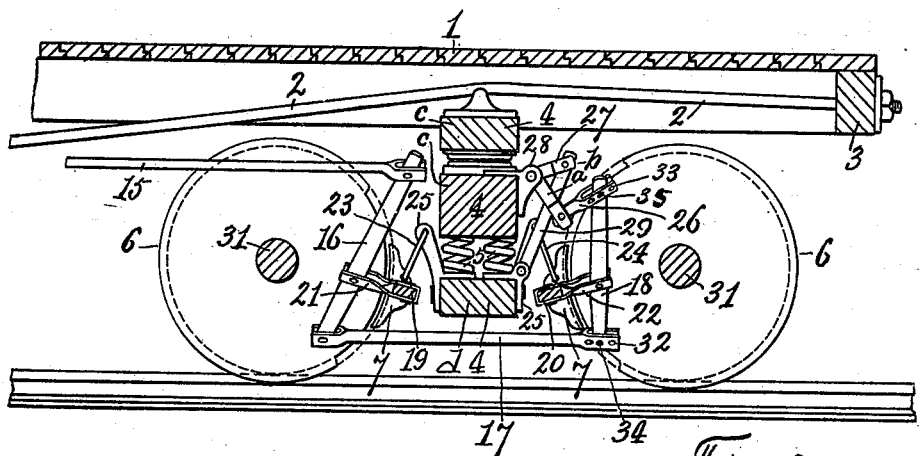

Reference being had to the accompanying drawings forming part of this specification, wherein;—Figure 1 is a sectional view of the flat car and end truck on the line $x$, $x$, of Fig. 3. In this view the position of the levers and attachments are shown when the car is unloaded and in this view the brakes are applied to the inside or adjacent sides of the wheels. Fig. 2 is another view of same showing the position of the levers and attachments when the car is loaded. Fig. 3 is a plan view of the flat car and end truck shown in Fig. 1. In this view the outline of the car is shown in dotted lines. Fig. 4 shows the application of this invention to the outside of the wheels.

In the accompanying drawings;—the numeral 1 indicates part of a car, in this case, part of the platform of a flat car, 2 the truss rod secured to the end sill 3 of the car 1, $c$, the upper timber of the truck 4 on the upper side of which the truss rod 2 rests, 5 the springs between the upper timber, $c$, and lower timber, $d$, of the truck 4, to take up the jar of the car 1, 6 the wheels of said truck 4, and 7 the brakes of said wheels, 6.

8 indicates the brake cylinder, shown particularly in Fig. 3, and secured in place to the underside of the car, in which brake cylinder 8 the air is compressed, 9 the piston rod of said brake cylinder 8, 10 a cross bar to which the piston 9 and longitudinal bar 11 is secured, as shown, 12 a bar secured to the cross bar 10, and 13 a chain secured to and extending from the bar 12 to and engaging with the brake wheel 14, the latter being operated by the brakeman from the top of the car, and 15 a rod extending from said cross bar 10 to the lever 16.

17 is a lower longitudinal bar to which the ends of the levers 16 and 18 are secured.

19 and 20 indicate brake beams to which the brakes 7 are connected, and 21 and 22 are couplings which connect the brake beams 19 and 20 about midway with the levers 16 and 18, as shown, 23 and 24 are hangers which support the brakes 7 from the castings 25 secured to the lower part of the truck 4, or from any other suitable support.

26 is a coupling rod which pivotally connects one end of lever 18 with one end $a$, of the bell crank lever 27.

27 is a bell crank lever pivotally mounted on the casting 28 secured to the upper timber, $c$, of the truck 4, and the other end, $b$, of this bell crank lever 27, is pivotally connected by a connecting bar 29 to a casting 25 secured to the lower timber, $d$, of said truck 4.

30 indicate metallic frames secured to the truck 4 and to the axles 31 of the wheels 6, as shown particularly in Fig. 3, to securely hold the frames 30 to the truck 4, and to pivotally attach said frames 30 to the axles 31.

32 indicate a series of holes in the longitudinal bar 17, and 33 a series of holes in the coupling rod 26, in which the bolts 34 and 35, respectively, may be moved for the adjustment of these parts.

In the modification, shown in Fig. 4, the brake beams 19 and 20, with the brakes 7 and attachments are shown outside of the wheels 6, in this case the casting 28 of the bell crank lever 27 has to be made longer as the bell crank lever 27 has to be reversed and the coupling 26 has to be made longer to reach the lever 18.

In general practice it is known that the braking power of a car is estimated at a certain per cent. of its light weight (about seventy per cent. on freight cars), and that this is not increased when the car is loaded. The weight of the train is increased and the strength of the brake is not. Also the piston travel has a great deal to do with the braking power. A thirteen pound reduction with a four inch piston travel gives fifty seven pounds pressure in the brake cylinder, while a twenty five pound reduction with a ten inch travel gives only forty seven pounds in the brake cylinder.

The object of this device therefore is to shorten the piston travel when the car is loaded by a system of levers connected with the levers 16 and 18 and the truck 4.

The operation is as follows:—As the unloaded car, shown in Fig. 1, is loaded to the position, shown in Fig. 2, the platform 1 and the upper timber, $c$, of the truck 4 lower to the position, shown in Fig. 2, compressing the springs 5 between the upper and lower timbers, $c$, and, $d$, of the truck 4. While the springs 5 have been compressing and the timber $c$ lowering, the connecting bar 29 has been raising the end, $b$, of the bell crank lever, thus raising the end, $a$, of said bell crank lever 27 as well as the end of the coupling rod 26. This forces the other end of the coupling rod 26 and the upper end of the lever 18 attached thereto outwardly and moves it to a greater distance from the truck 4, or to a more nearly vertical position. The two levers 16 and 18 being connected at their lower ends by the bar 17, outward motion thus imparted to lever 18 is partially transmitted to the lever 16 and each brake block 7 is brought closer to its respective wheel. It is therefore evident that the brake rod 15 and the operating piston will travel a less distance in applying the brakes to a loaded car than to an unloaded car.

A device constructed as described provides a simple, strong and durable braking power, one in which the braking power of the car is increased when loaded, and one that is efficient in practical use.

Having thus described my invention, I claim:—

1. A device of the class described comprising a truck formed with upper and lower timbers, springs between said timbers, upwardly-extending levers positioned at opposite sides of said timbers, a longitudinal bar connecting the lower ends of said levers, brake beams, brakes secured to said brake beams, coupling means connecting said brake beams to said levers intermediate the ends of the latter, a coupling rod connected to the upper end of one of said levers, a brake cylinder, a piston within said cylinder, a longitudinal rod connecting the other of said levers at its upper end with said piston, a connecting bar pivoted to the lower timber, a bell crank lever pivoted to the upper timber, one arm of said bell crank lever connected to said coupling rod and the other arm thereof to said connecting bar, castings secured to opposite sides of the lower beam, and supporting hangers pivoted to said castings and brakes.

2. In a device of the class described, a vehicle, a truck secured to said vehicle and formed with upper and lower timbers, springs between said timbers, and wheels secured to said truck, in combination with levers, a longitudinal bar connecting the lower ends of said levers together, a coupling rod connected to one of said levers, a brake cylinder, a brake cylinder piston, a longitudinal rod connecting the other of said levers with said brake cylinder piston, a connecting bar connected to the lower timber of said truck, a bell crank lever, one of the arms of which is connected to said coupling rod and the other to said connecting bar, and said bell crank lever connected to the upper timber of said truck.

3. In a device of the class described, a vehicle, a truck secured to said vehicle and formed with upper and lower timbers, springs between said timbers, and wheels secured to said truck, in combination with levers, a longitudinal bar connecting the lower ends of said levers together, brake beams, brakes connected to said brake beams and adapted to lie close to said wheels, couplings for connecting said brake beams with said levers, a coupling rod connected to one of said levers, a brake cylinder, a brake cylinder piston, a longitudinal rod connecting the other of said levers with said brake cylinder piston, a connecting bar connected to the lower timber of said truck, a bell crank lever, one of the arms of which is connected to said coupling rod and the other to said connecting bar, and said bell crank lever connected to the upper timber of said truck.

In testimony whereof, I have signed in the presence of the two undersigned witnesses.

GEORGE F. SOUTH.

Witnesses:
P. J. EDMUNDS,
S. HARDY.